United States Patent Office 3,372,516
Patented Mar. 12, 1968

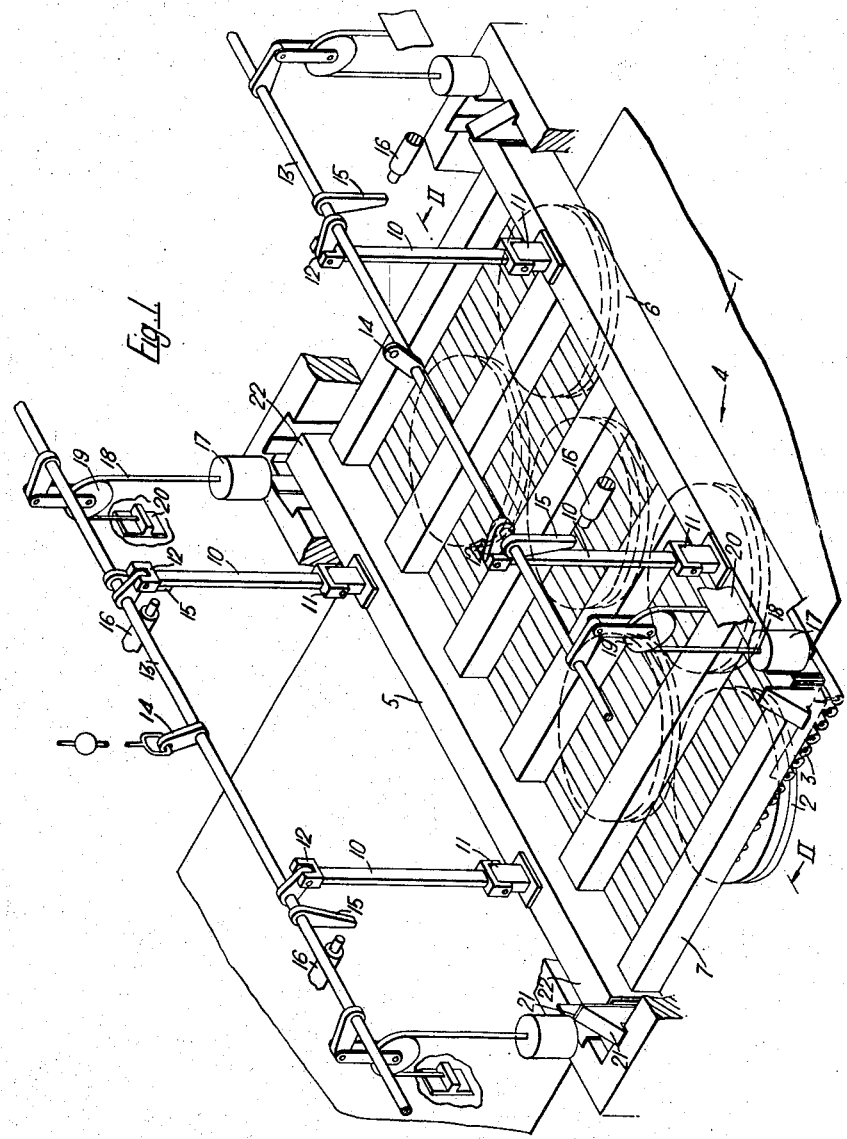

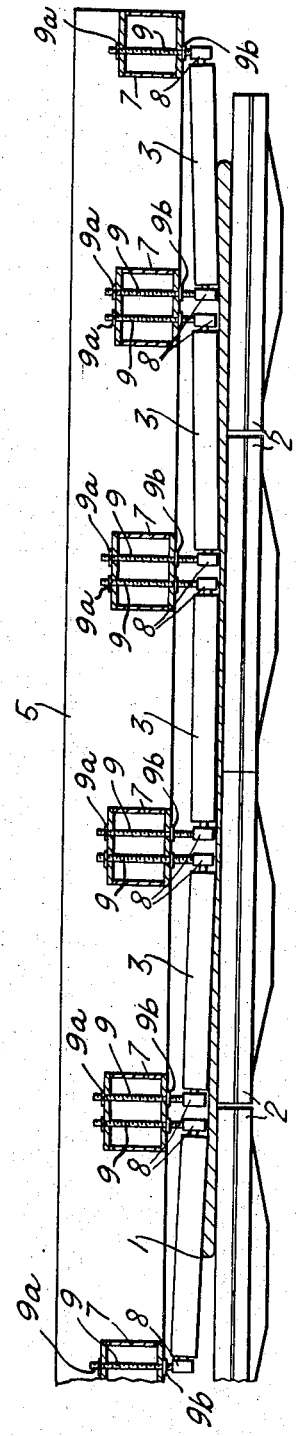

3,372,516
PRESSURE ROLLERS FOR GLASS RIBBON POLISHING MACHINE
George Alfred Dickinson and Thomas Stanley Cook, St. Helens, England, assignors to Pilkington Brothers Limited, Liverpool, England, a corporation of Great Britain
Filed Aug. 21, 1964, Ser. No. 391,183
Claims priority, application Great Britain, Aug. 29, 1963, 34,259/63
9 Claims. (Cl. 51—110)

This invention relates to apparatus for imparting a a substantially uniform surface to flat glass.

In apparatus for surfacing flat glass comprising power-driven surfacing tools arranged to operate on one face of flat glass, which may be in the form of individual sheets of flat glass or alternatively may be a continuous ribbon of flat glass, it is found that variations in the individual surfacing tools give rise to lack of uniformity in the surface finish obtained over different areas of the glass. Also the presence of slight variations of the order of a few thousandths of an inch in the thickness of the glass across its width affects the degree of surfacing obtained. Accordingly it has been the practice hitherto to operate in such a way that the areas of the glass which are subjected to the minimum action are surfaced adequately with the result that other areas of the glass are surfaced more than is economically necessary.

Accordingly it is a main object of the present invention to compensate for deficiencies in the degree of attack of the surfacing elements in order that the desired surfacing effort is obtained on each part across the width of the glass. This object is achieved, in accordance with the present invention, by the use of apparatus for surfacing flat glass, which apparatus can be adjusted to compensate for non-uniformity of the surfacing action consequent, for example, upon the inherent design of the surfacing elements themselves.

According to the present invention there is provided apparatus for imparting a substantially uniform surface to flat glass comprising power-driven surfacing tools disposed to operate on one face of the glass, and oppositely disposed means comprising a plurality of transverse series of rollers, a roller in each series being adjustable relative to at least one other roller in the same series in a plane perpendicular to the plane of the glass.

The invention has particular application in the surfacing of flat glass in ribbon form. When glass is produced in ribbon form it is possible for a fault to occur regularly in the ribbon as a band along the length of the ribbon and the presence of this band would result in non-uniformity of surface when the ribbon is subjected to a surfacing operation in a conventional surfacing apparatus.

Accordingly it is a particular object of the present invention to provide apparatus for compensating for non-uniformity of surface which may occur in a glass ribbon which is subjected to a surfacing operation.

The present invention therefore also provides apparatus for imparting a substantially uniform surface to flat glass in ribbon form, the apparatus comprising power-driven surfacing tools disposed to operate on one face of the glass ribbon, and oppositely disposed means comprising a plurality of transverse series of rollers, the rollers in each series being independently adjustable relative to the other rollers in the same series in a plane perpendicular to the plane of the glass ribbon.

In order that no part of the glass is unsupported during its entire travel through the surfacing apparatus, the corresponding rollers in different series of rollers may be of unequal lengths. Alternatively, all the rollers in the different series may be of the same length and the corresponding rollers in the different series arranged in a staggered relation.

According to one aspect of the invention the surfacing tools may be polishing blocks which are used, for example, in a final polishing operation or for cleaning a glass surface which is already polished, for example a fire-finished surface.

According to this aspect of the invention there is provided apparatus for treating the surface of flat glass in ribbon form, comprising power-driven polishing blocks disposed to operate on one face of the glass ribbon and oppositely disposed means comprising a frame carrying a plurality of transverse series of rollers of substantially equal length, the rollers in different series and bearing successively on the same part of the glass ribbon being similarly adjustable, relative to one or more other rollers in the respective series, in a plane perpendicular to the plane of the glass ribbon.

The rollers may be independently mounted on the frame. Alternatively the corresponding rollers in each series may be mounted on a common member which is adjustable on the frame in a plane perpendicular to the glass. In this latter arrangement each roller in each series is capable of adjustment relative to all the other rollers in the same series.

The apparatus according to the present invention has a particular application in the surfacing of flat glass in ribbon form which is horizontally advanced through the apparatus and accordingly from this aspect of the invention the polishing blocks may be arranged to surface the underface of a horizontal ribbon of glass advanced through the apparatus, and the apparatus further comprises counter-balances in association with said frame whereby a desired reactive force is maintained on the other face of the glass ribbon by the rollers mounted on the said frame.

The polishing pads underneath the ribbon are brought up to a fixed height equal to the approximate height of the advancing glass ribbon. Accordingly the frame is arranged so that the rollers ride over the upper face of the glass ribbon and maintain the lower face of the glass ribbon in contact with the polishing blocks. The counter-balances control the desired pressure of the frame on the upper surface of the glass ribbon.

Preferably the frame is rectangular and guide members associated with the corners of the said frame permit vertical movement of the frame whilst constraining horizontal movement of the frame.

The apparatus of the present invention has particular application in the final finishing operation to the surface of a ribbon of flat glass which may be already substantially free from surface defects, for example a ribbon of glass prepared by the process described in our U.S.A. Patent No. 3,083,551.

Use of the apparatus according to the present invention involves the attaining of a substantially uniform surface on flat glass by movement of the rollers in a plane vertical to the glass, with corresponding variations in the pressure applied to the glass across the width of the glass.

Advantageously the pressure applied over the length of a line transverse to the direction of advance of the glass may be varied to any desired average figure.

According to another aspect, the present invention comprehends for use in apparatus according to the invention a frame carrying a plurality of transverse series of rollers of substantially equal length, which rollers are mounted on the frame and capable of independent adjustment relative to the frame in a plane perpendicular to the area prescribed by the frame.

In order that the invention may be more clearly understood a preferred embodiment thereof will now be described, by way of example, with reference to the accompanying drawings in which like reference numerals indicate the same or similar parts and in which:

FIGURE 1 is a perspective view of apparatus in accordance with the invention for surfacing flat glass in ribbon form, and FIGURE 2 is a section on the line II—II of the apparatus of FIGURE 1, with details of the lifting apparatus omitted.

Referring now to the drawings there is shown apparatus for surfacing a horizontal flat glass ribbon 1. The apparatus comprises an upper part and a lower part between which the ribbon 1 may be advanced by drive rollers (not shown).

The lower part of the apparatus consists of six polishing blocs 2 carrying felt polishing pads of known kind which are arranged at a fixed height to rub against the underface of the glass ribbon 1.

The polishing blocks 2 are grouped in two sets of three, each set being mounted on a spider (not shown) which may be rotated so that the three polishing blocks sweep out an annular path on the underface of the glass ribbon whilst rotating around their own axes.

In the drawings there is shown a glass ribbon 1 which is thicker at its edges than in its central portion. The thickness variation, which is shown greatly exaggerated in FIGURE 2 is of the order of a few thousandths of an inch and, in the ribbon shown, exists as a greater thickness on the upper side of the edges of the glass ribbon. The upper part of the apparatus comprises a plurality of transverse series of rubber-covered rollers 3 of substantially equal length which bear on the area of the upper face of the glass ribbon 1 corresponding to the area of the lower face rubbed by the polishing blocks 2. The rollers 3 hold the lower face of the glass ribbon 1 in contact with the polishing blocks 2.

The rollers 3 are mounted on a rectangular frame shown generally at 4 built up from two transverse steel members 5 and 6 which are joined by six equidistant longitudinal hollow steel ribs 7. As will be seen from FIGURE 2 each transverse series of rollers consists of five rollers each roller being mounted on two neighbouring ribs 7 of the frame 4.

The ends of the rollers 3 are carried in brackets 8 joined to struts 9 which are mounted in the hollow ribs 7. As exemplified, the struts 9 are threaded and pass vertically through the hollow ribs 7, being adjustably held in the ribs by upper and lower nuts 9a and 9b which are threaded onto the struts and respectively bear against the upper and lower outer faces of the ribs 7. The struts 9 may be adjusted in a vertical direction so that the rollers may be raised and lowered to positions to make contact with the contour of the upper face of the glass ribbon 1. As will be seen, the adjustability of the struts at the ends of each roller permits the adjustment of that roller in a vertical direction as well as the adjustment of the inclination of the roller, and consequently the relative inclination of that roller and another of the rollers. By varying the positions of the rollers 3 independently of one another, varying pressures are applied across the width of the glass ribbon 1, and in particular a greater pressure may be applied to the central portion of the glass ribbon to surface this sufficiently.

The joint line between ends of rollers in adjacent transverse series is arranged to lie at a slight angle to the longitudinal axes of the glass ribbon 1, so that as the glass ribbon 1 is advanced under the rollers 3, no portion of the upper surface thereof is unsupported against the polishing pressure applied to the underface by the polishing blocks 2 throughout the whole passage of the glass through the apparatus.

If a break should occur in the glass ribbon it is undesirable for the broken portion to be held under pressure against the polishing blocks 2 since damage of the felt pads would then take place. Furthermore it is periodically necessary to clean the rollers 3 as cullet may accumulate thereon. Accordingly the frame 4 is provided with lifting gear which is used to lift the whole frame off the upper surface of the glass ribbon when required.

As will be seen from FIGURE 1 the lifting gear comprises four connecting rods 10 which are hinged at 11 to the steel members 5 and 6 and are also hinged at 12 to two steel axles 13 whose ends are supported. The axles 13 carry noses 14 which when they are depressed rotate the axles 13 and lift the frame 4. The frame 4 is prevented from crashing down onto the glass ribbon 1 by flanges 15 mounted on the axles 13 which abut the stops 16 when the frame 4 is in the lowest position desired.

The dead weight of the frame 4 together with that of the rollers 3 and lifting gear is much greater than is necessary to apply a surfacing pressure to the glass ribbon 1. The desired surfacing pressure of the frame 4 on the glass ribbon 1 is obtained by counter-balancing the weight of the frame 4.

Accordingly the apparatus of FIGURE 1 includes counterbalances which consist of weights 17 mounted on wires 18 which pass over pulleys 19 carried by the axles 13 and are anchored at 20. The desired pressure on the ribbon 1 is obtained by adding to or subtracting from the weights 17.

In carrying out the method of the invention, the glass ribbon is advanced in a horizontal plane through the apparatus and the frame 4 is lowered into position with the rollers 3 on the upper face of the glass ribbon by actuation of crank 14 by a motor and screw arrangement not shown. The underface of the glass ribbon is rubbed in an annular path by the polishing blocks to which is fed polishing rouge. The rouge is conveniently fed to the portion of each block which overlies the edge of the glass ribbon as the blocks are rotated.

The rollers 3 carried by the frame 4 are caused to bear on the upper face of the glass sheet so that they ride over the upper face of the glass ribbon and apply a downwardly directed force over the area of the glass ribbon which is being rubbed.

As the rollers ride over the glass sheet, the frame is constrained to move in a vertical direction only by guide members 21 associated with the corners 22 of the frame 4.

By the use of the present invention as herein described a substantially uniform work curve is obtained over the width of the glass ribbon being surfaced.

In particular the use of the apparatus described above enables flat glass to be produced with a surface free from faults which occur regularly in a band along the length of the ribbon or sheet. In the past such faults have been present in the surface of the glass, either because they were present in the flat glass fed to the surfacing apparatus or because they were introduced by the surfacing tools.

The advantageous results arising from employment of the invention are achieved by appropriate variation of the support given to the face of the glass opposite to the face being surfaced.

We claim:

1. Apparatus for imparting a substantially uniform surface to flat glass comprising power-driven surfacing tools disposed to operate on one face of the glass, and oppositely disposed pressure means comprising a plurality of transverse series of rollers, and an adjustable mounting for at least one roller in each transverse series of rollers, said mounting including individually adjustable means at each end of that roller permitting adjustment of each end of that roller relative to at least one other roller in the same series in a plane perpendicular to the plane of the glass.

2. Apparatus for imparting a substantially uniform surface to flat glass in ribbon form, the apparatus comprising power-driven surfacing tools disposed to operate on one face of the glass ribbon, and oppositely disposed pressure means comprising a plurality of transverse series of rollers, and an adjustable mounting for at least one roller in each transverse series of rollers, said mounting including individually adjustable means at each end of that roller permitting adjustment of that roller relative to the other rollers in the same series in a plane perpendicular to the plane of the glass ribbon and adjustment of the relative inclination of that roller and another.

3. Apparatus according to claim 2, wherein said pressure means comprises a frame carrying said plurality of transverse series of rollers, which rollers are of substantially equal length.

4. Apparatus according to claim 1, wherein corresponding rollers in different series are of unequal length.

5. Apparatus according to claim 3, wherein each roller is mounted independently on the frame.

6. Apparatus according to claim 3, wherein the polishing blocks are arranged to surface the underface of a horizontal ribbon of glass advanced through the apparatus, and the oppositely disposed pressure means comprises counter-balances in association with said frame whereby a desired reactive force is maintained on the other face of the glass ribbon by the rollers mounted on said frame.

7. Apparatus according to claim 3, wherein the frame is a rectangular frame and guide members associated with the corners of the said frame permit vertical movement of the frame whilst constraining horizontal movement of the frame.

8. Apparatus according to claim 3, wherein the corresponding rollers in different series are arranged in staggered relation.

9. For use in apparatus according to claim 3, a frame carrying a plurality of transverse series of rollers of substantially equal length, which rollers are mounted on the frame and capable of independent adjustment relative to the frame in a plane perpendicular to the area prescribed by the frame.

References Cited

UNITED STATES PATENTS

| 1,012,651 | 12/1911 | Kelley | 51—78 |
| 1,722,589 | 7/1929 | Miller | 51—110 |
| 2,673,424 | 3/1954 | Laverdisse | 51—283 |

FOREIGN PATENTS

| 243,074 | 11/1925 | Great Britain. |

HAROLD D. WHITEHEAD, *Primary Examiner.*